Patented Nov. 20, 1928.

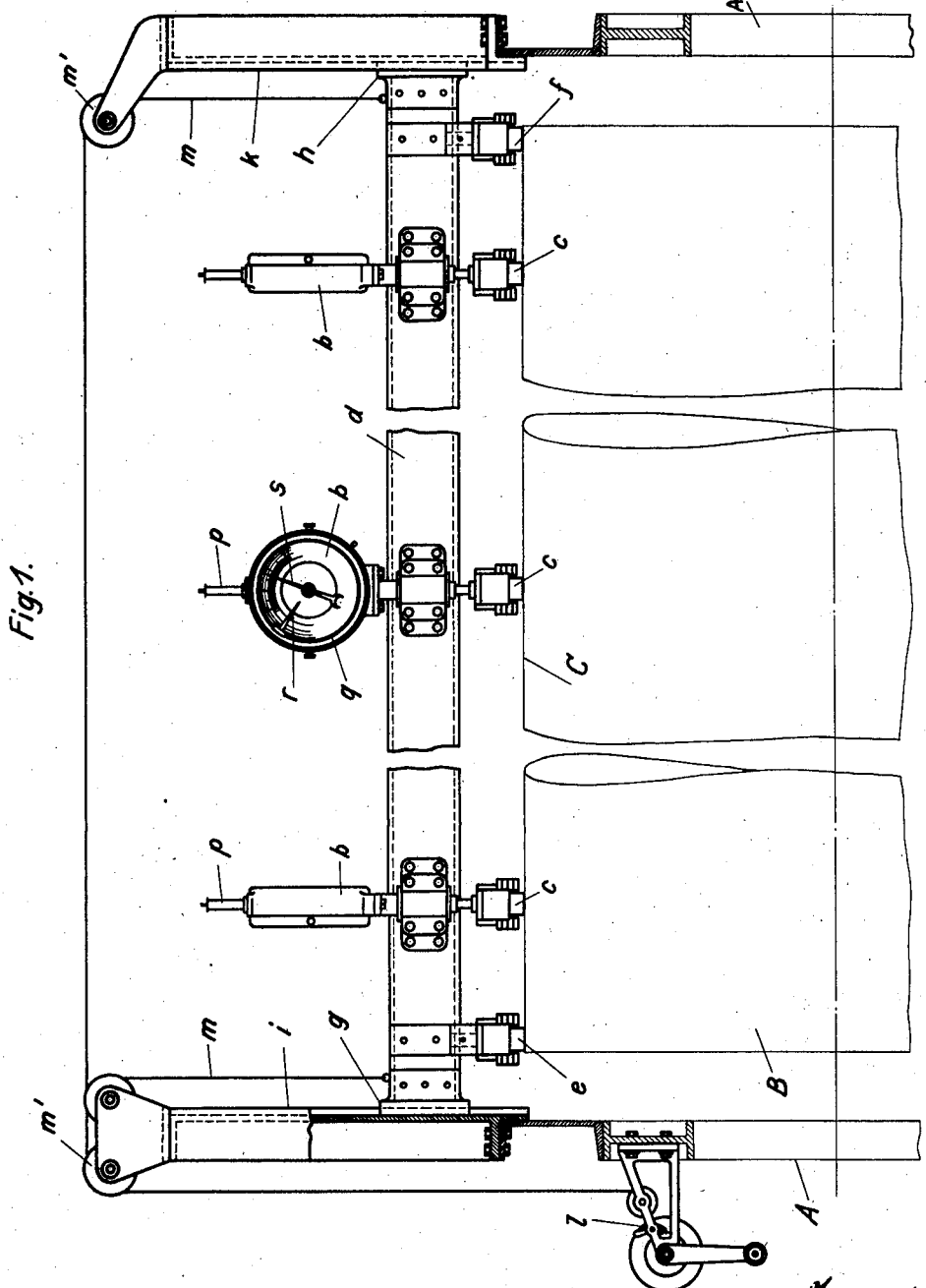

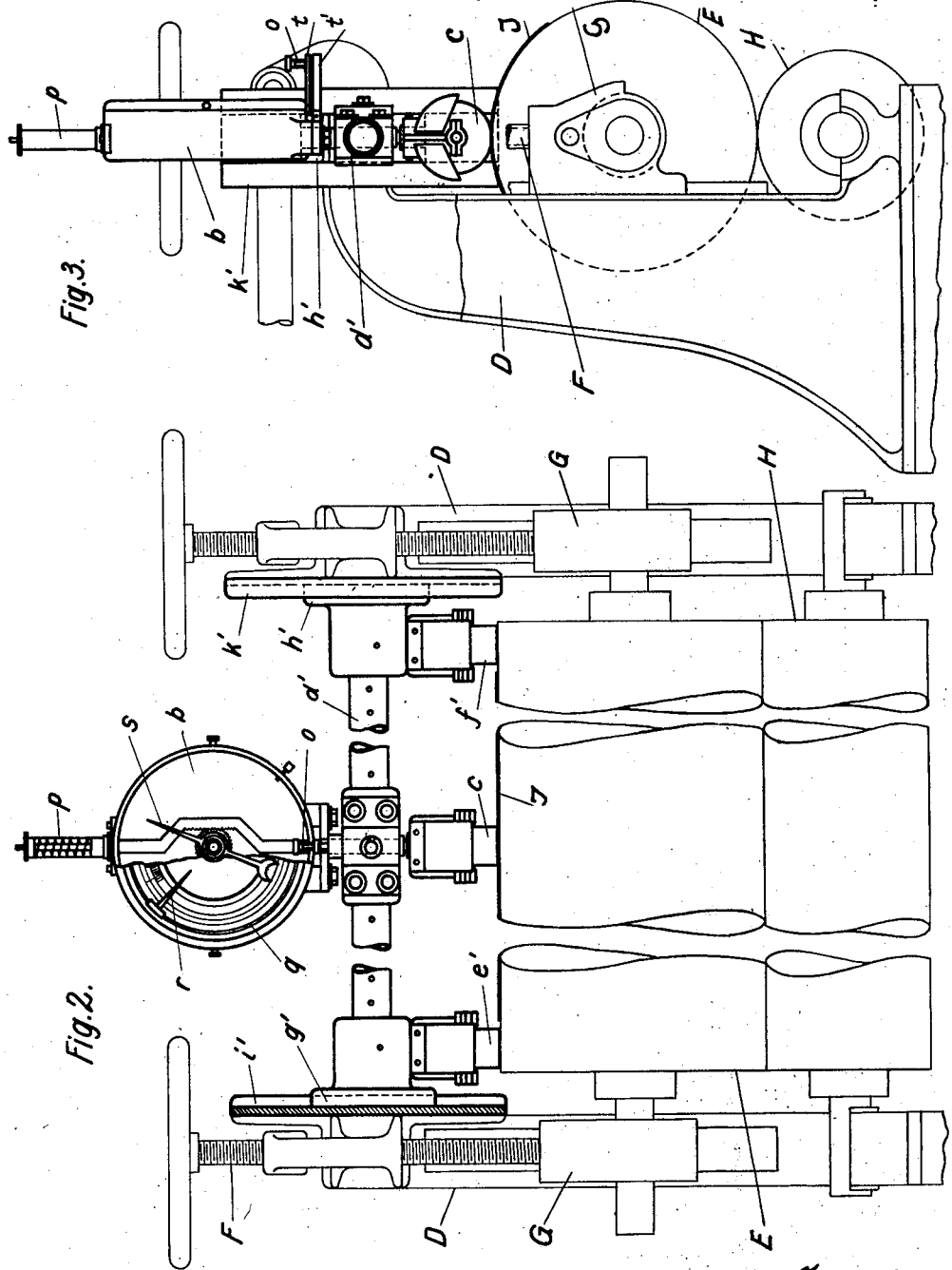

1,692,243

UNITED STATES PATENT OFFICE.

WILHELM BECKMANN, OF DUISBURG, AND ALFRED SCHOPPER, OF LEIPZIG, GERMANY; SAID BECKMANN ASSIGNOR TO SAID SCHOPPER.

MEASURING APPARATUS FOR THE THICKNESS OF WEBS.

Application filed May 16, 1927, Serial No. 191,791, and in Germany February 19, 1925.

Our invention relates to apparatus for measuring the thickness of webs, for instance the webs formed in paper and cardboard machines. It is an object of our invention to eliminate certain drawbacks connected with apparatus of this type as heretofore designed, and to this end we provide means for measuring the relative displacement of a feeler and the perimeter of a cylinder on which the web is carried, instead of measuring the relative displacement of the feeler and the frame of the machine, as was done heretofore.

In a preferred embodiment of our invention we provide a carrier which is freely supported on the perimeter of the cylinder carrying the web, but on that part of it which is not covered by the web, and on this carrier we arrange a number of measuring instruments equipped each with a feeler to bear on the web. It will be understood that in apparatus of this kind the measuring instrument is not influenced by vibrations or deformations of the machine frame as it is supported on the cylinder independently of the frame.

In measuring apparatus of the kind described and as heretofore designed for paper machines, the measuring instrument is secured to the frame of the machine above the cylinder, and a feeler forming part of the instrument engages the web on the cylinder. Obviously the vibrations to which a paper machine is subjected will be transmitted to the measuring instrument and to its support and, as the support will vibrate differently from the frame due to the difference in weight, the hand of the measuring instrument will permanently oscillate and accurate reading is impossible. Besides the feeler of the measuring instrument is in the way when inserting a new web. These drawbacks are so serious that a permanent supervision of the web thickness is frequently neglected in paper making machines notwithstanding its importance.

In cardboard machines it is altogether impossible to measure the thickness of the web directly in the manner described as in addition to the vibrations of the machine the cylinder will be raised and lowered when the web moves onto it and the finished cardboard is removed, and therefore in such machines the thickness of the cardboard web was measured indirectly by arranging a measuring instrument laterally on the frame of the machine and transmitting motion to the instrument from the trunnions of the cylinder. Obviously accurate measurements cannot be obtained in this manner unless the bearings of the cylinder are machined to a degree of exactitude which is as a rule not found in machines of this type.

Our novel apparatus eliminates these drawbacks and is suitable for paper, cardboard, and any other machines which make or convey a web. A feature it has in common with existing apparatus is a feeler engaging the web which is moving on a cylinder but according to our invention we do not measure the displacement of the feeler with respect to a fixed point, as the frame of the machine, but its displacement with respect to the cylinder itself.

In the drawings affixed to this specification and forming part thereof paper and cardboard machines to which our invention is applied, are illustrated diagrammatically by way of example.

In the drawings,

Fig. 1 is an end elevation showing part of the frame of a paper machine, partly in section, Fig. 2 is an end elevation, and Fig. 3 is a side elevation of a cardboard machine, Fig. 2 being shown partly in section, and the upright at the left of the machine being broken away in Fig. 3.

Referring to Fig. 1, A is the frame of a paper machine in which a cylinder B is carried. The frame A is equipped with slide bars $i$ and $k$ and shoes $g$ and $h$ at the ends of a girder $d$ are adapted to slide on the bars. The girder $d$ is equipped with rollers $e$ and $f$ by which it is supported on the perimeter of the cylinder B where the cylinder is not covered by the web C. $b$ are measuring instruments, in the present instance three, which are of the dial type and equipped with feelers and rollers $c$ which rest on the web C. $s$ is the hand of the instrument $b$, which is so set with respect to the roller $c$ that it will indicate "zero" when the machine is not in operation, that is, when the roller $c$ bears directly on the cylinder B. $q$ is a contact strip in the dial and $r$ is a contact which is adapted to be adjusted on the strip so that the hand $s$ makes contact with it when the hand is in a given position. In this manner, a circuit (not shown) is closed and a signal is given when the thickness of the web does not keep within certain limits.

Three instruments have been illustrated, the instrument at the centre being arranged at right angles to the instruments at the sides, but obviously any number of instruments may be provided and arranged as desired, without departing from our invention. A spring casing $p$ may be provided for relieving the pressure which the rollers $c$ exert on the web by gravity and which would detract from the accuracy of the indications.

The girder $d$ can be raised and lowered by means of a winch $l$, and cables $m$ moving on pulleys $m'$ in the frame A are secured to both ends of the girder. Obviously other means might be provided for raising and lowering the girder. This arrangement is provided for facilitating the insertion of a fresh web.

With a web C on the cylinder B, and with the girder $d$ in lowered position so that its supporting rollers $e$ and $f$ are carried on the free perimeter of the cylinder B, the rollers $c$ at the feelers of the measuring instruments engage the web and will be raised and lowered in accordance with its variation in thickness and the thickness of the web will permanently be indicated by the instrument or instruments $b$. It will be understood that after the girder $d$ has been raised in order to introduce a new web, all that is required will be to lower it until its rollers $e, f$ are in contact with the cylinder B, as described, without the necessity of regulating its position.

Referring now to Figs. 2 and 3, D, D are uprights at both ends of the machine in which the trunnions of a cylinder E are carried by means of spindles F and slide blocks G, and H is a cylinder on which the cylinder E is supported.

$d'$ is a girder which is adapted to move between slide bars $i'$ and $k'$ with slide blocks $g'$ and $h'$ as described with reference to Fig. 1, and supported on the free perimeter of the cylinder E by rollers $e'$ and $f'$. J is the web of cardboard on the cylinder E and $c$ is the roller of the measuring instrument $b$ which is engaging the web exactly as described with reference to Fig. 1. The measuring instrument is also the same as in Fig. 1 but in this case it is necessary to prevent damage to the instrument due to the roller $c$ striking the face of the cylinder E after the web J has been removed. This is prevented by an adjustable screw $o$ in a support $t$ pressing against a lever $t'$, which maintains the roller $c$ at a certain distance from the face of the cylinder E. The instrument is operated after the cylinder has performed several revolutions so that the space between it and the roller $c$ is filled in by the web.

We wish it to be understood that we do not desire to be limited to the exact details of constructions shown and described for obvious modifications will occur to a person skilled in the art.

We claim:

Web-making machine comprising a frame, a web supporting cylinder in said frame, a carrier, anti-friction means for supporting said carrier on said cylinder by gravity, guides in said frame in which said carrier is adapted to reciprocate, means for lifting said carrier, a measuring instrument on the carrier, and a feeler on said measuring instrument supported on said cylinder.

In testimony whereof we affix our signatures.

WILHELM BECKMANN.
ALFRED SCHOPPER.